(12) United States Patent
Borate et al.

(10) Patent No.: US 12,146,449 B2
(45) Date of Patent: Nov. 19, 2024

(54) SYSTEMS AND METHODS OF FUEL INJECTION TIMING DRIFT DETECTION AND COMPENSATION

(71) Applicant: Cummins Inc., Columbus, IN (US)

(72) Inventors: Mayur H. Borate, Pune (IN); Srinivas Kumar Mulukutla, Columbus, IN (US); Shailesh Nair, Pune (IN); David Michael Carey, Bend, OR (US); Syed Shah Jalal, Indianapolis, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 17/909,933

(22) PCT Filed: May 6, 2021

(86) PCT No.: PCT/US2021/031021
§ 371 (c)(1),
(2) Date: Sep. 7, 2022

(87) PCT Pub. No.: WO2021/252109
PCT Pub. Date: Dec. 16, 2021

(65) Prior Publication Data
US 2024/0200504 A1 Jun. 20, 2024

(30) Foreign Application Priority Data
Jun. 10, 2020 (IN) .............................. 202011024405

(51) Int. Cl.
*F02D 41/22* (2006.01)
*F02D 41/00* (2006.01)
*F02D 41/40* (2006.01)

(52) U.S. Cl.
CPC ......... *F02D 41/221* (2013.01); *F02D 41/009* (2013.01); *F02D 41/401* (2013.01);
(Continued)

(58) Field of Classification Search
CPC ........ F02D 41/02; F02D 41/22; F02D 41/221; F02D 41/402; F02D 41/403;
(Continued)

(56) References Cited

U.S. PATENT DOCUMENTS 9,169,784 B2 * 10/2015 Moonjelly ........... F02M 63/023
9,267,460 B2 * 2/2016 Carey .................. F02M 65/006
(Continued)

OTHER PUBLICATIONS

International Search Report and Written Opinion for International patent application No. PCT/US2021/031021, filed May 6, 2021, mailed Aug. 12, 2021.

*Primary Examiner* — Carl C Staubach
*Assistant Examiner* — Johnny H Hoang
(74) *Attorney, Agent, or Firm* — Taft, Stettinius & Hollister LLP

(57) ABSTRACT

At least some embodiments of present disclosure direct to a fuel injection timing drift detection and/or compensation system. In some cases, the system collects or receives a series of fuel pressure data measured by one or more fuel pressure sensors. The system is configured to receive an indication of fuel flow cutout and a start-of-injection command signal. The system calculates a set of pressure drops using the series of fuel pressure data and identifies a selected pressure drop greater than a predetermined threshold to determine a measured start-of-injection timing based on the selected pressure drop. The system is further configured to evaluate whether a fuel injection drifting occurs based on received start-of-injection command signal and the measured start-of-injection timing. In some cases, the fuel injection drifting is used to either compensate fuel injection timing or raise a flag indicating the drifting.

22 Claims, 7 Drawing Sheets

(52) U.S. Cl.
CPC .. *F02D 2041/224* (2013.01); *F02D 2041/228* (2013.01); *F02D 2200/0602* (2013.01); *F02D 2200/0618* (2013.01)

(58) Field of Classification Search
CPC ......... F02D 41/3845; F02D 2200/0612; F02D 2200/0614; F02D 2200/0616; F02D 2041/224; F02M 63/0225; F02M 63/023; F02M 65/003
See application file for complete search history.

(56) References Cited

U.S. PATENT DOCUMENTS

| | | | |
|---|---|---|---|
| 9,470,167 B2* | 10/2016 | Carey | F02M 55/025 |
| 10,184,417 B2* | 1/2019 | Carboni | F02D 41/123 |
| 2011/0224888 A1 | 9/2011 | Girotto et al. | |
| 2012/0175435 A1 | 7/2012 | Yamashita et al. | |
| 2014/0224218 A1* | 8/2014 | Carey | F02D 41/2441 |
| | | | 73/114.43 |
| 2014/0224220 A1 | 8/2014 | Moonjelly et al. | |
| 2014/0251272 A1 | 9/2014 | Moonjelly et al. | |
| 2015/0020777 A1* | 1/2015 | Carey | F02D 41/3845 |
| | | | 123/445 |
| 2016/0017837 A1* | 1/2016 | Carey | F02D 41/402 |
| | | | 123/480 |

* cited by examiner

SYSTEMS AND METHODS OF FUEL INJECTION TIMING DRIFT DETECTION AND COMPENSATION

CROSS-REFERENCE TO RELATED APPLICATIONS

This application claims priority to International Patent Application No. PCT/US2021/031021, filed May 6, 2021, which claims priority to Indian Patent Application No. 202011024405, filed Jun. 10, 2020 the disclosure of which are hereby expressly incorporated by reference in their entirety.

TECHNICAL FIELD

This disclosure generally relates to systems and methods of fuel injection timing drift detection and compensation.

BACKGROUND

In internal combustion engines, one or more fuel pumps deliver fuel to a common rail. Fuel is delivered by fuel injectors from the rail to cylinders of the engine for combustion to power operation of the system driven by the engine. As with all mechanical devices, fuel injectors have physical dimensions that lead to variations between fuel injectors. In addition, each fuel injector has different rates of wear and responds to temperature changes differently. Due to these physical variations, injectors can have injection timing drifts. Further, the timing of fuel injection affects the combustion efficiency for engines.

SUMMARY

It is desirable for a variety of reasons to detect and control the fuel injection timing in an internal combustion engine or other engine. In some cases, it is challenging to meet injection timing diagnostic requirements of on-board diagnostics regulations. In some cases, engine position sensor (EPS) diagnostics provide timing shift detection, but phase shift error cannot be detected at a finer resolution and compensated for emission benefits. Additionally, fuel injection timing drift is often not being actively monitored and corrected for, through the engine life cycle. Further, in some cases, a precise control of the fuel injection timing can optimize combustion and improve fuel efficiency. At least some embodiments of the present disclosure use crank synchronous pressure data collected during a fuel flow cutout period to measure the start-of-injection ("SOI") timing for each cylinder of the engine. In some cases, a timing drift or a timing offset is calculated by comparing the measured SOI timing and the commanded SOI timing. In some cases, the timing drift or timing offset is used to generate a compensation scheme for the fuel injection timing drift. In some cases, the timing compensation or the timing offset for one or more injectors are analyzed to flag a fault code.

One embodiment of present disclosure is directed to a system comprising one or more memories having instructions and a series of fuel pressure data measured by a fuel pressure sensor stored thereon; and one or more processors configured to execute the instructions to perform operations. The operations comprise: receiving an indication of fuel flow cutout; receiving a start-of-injection command signal. The operations further comprise, in response to receiving the indication of fuel flow cutout, calculating, by the one or more processors, a set of pressure drops using the series of fuel pressure data; comparing, by the one or more processors, the set of pressure drops with a predetermined threshold to identify a selected pressure drop greater than the predetermined threshold; determining, by the one or more processors, a measured start-of-injection timing based on the selected pressure drop; and evaluating, by the one or more processors, whether a fuel injection drifting occurs based on the received start-of-injection command signal and the measured start-of-injection timing.

Another embodiment of present disclosure directs to a method implemented by a computer system having one or more processors and memories. The method comprises the steps of: collecting a series of fuel pressure data; receiving an indication of fuel flow cutout; receiving a start-of-injection command signal. The method further comprises: in response to receiving the indication of fuel flow cutout, calculating, by the one or more processors, a set of pressure drops using the series of fuel pressure data; comparing, by the one or more processors, the set of pressure drops with a predetermined threshold to identify a selected pressure drop greater than the predetermined threshold; determining, by the one or more processors, a measured start-of-injection timing based on the selected pressure drop; and evaluating, by the one or more processors, whether a fuel injection drifting occurs based on the received start-of-injection command signal and the determined start-of-injection timing.

Yet another embodiment of present disclosure directs to a method implemented by a computer system having one or more processors and memories. The method comprises the steps of: collecting a series of crank synchronized fuel pressure data; receiving a start-of-injection command signal; calculating, by the one or more processors, a set of pressure drops using the series of crank synchronous fuel pressure data collected during a fuel flow cutout period; comparing, by the one or more processors, the set of pressure drops with a predetermined threshold to identify a selected pressure drop greater than the predetermined threshold; determining, by the one or more processors, a measured start-of-injection timing based on the selected pressure drop; and evaluating, by the one or more processors, whether a fuel injection drifting occurs based on the received start-of-injection command signal and the measured start-of-injection timing.

While multiple embodiments are disclosed, still other embodiments of the present disclosure will become apparent to those skilled in the art from the following detailed description, which shows and describes illustrative embodiments of the disclosure. Accordingly, the drawings and detailed description are to be regarded as illustrative in nature and not restrictive.

BRIEF DESCRIPTION OF DRAWINGS

The above-mentioned and other features of this disclosure and the manner of obtaining them will become more apparent and the disclosure itself will be better understood by reference to the following description of embodiments of the present disclosure taken in conjunction with the accompanying drawings, wherein.

DETAILED DESCRIPTION

In certain embodiments, an engine described below includes a control system structured to perform certain operations to control a fuel system and detect and control a fuel injection timing. In certain embodiments, the control system includes a portion of a processing subsystem with one or more computing devices having a memory or multiple memories, a processor or multiple processors, and various communication hardware components. The processing subsystem may be a single device or a distributed device, and the functions of a controller of the subsystem (described below) may be performed by hardware and/or executing computer instructions stored on a non-transitory computer readable storage medium.

Figure 1:
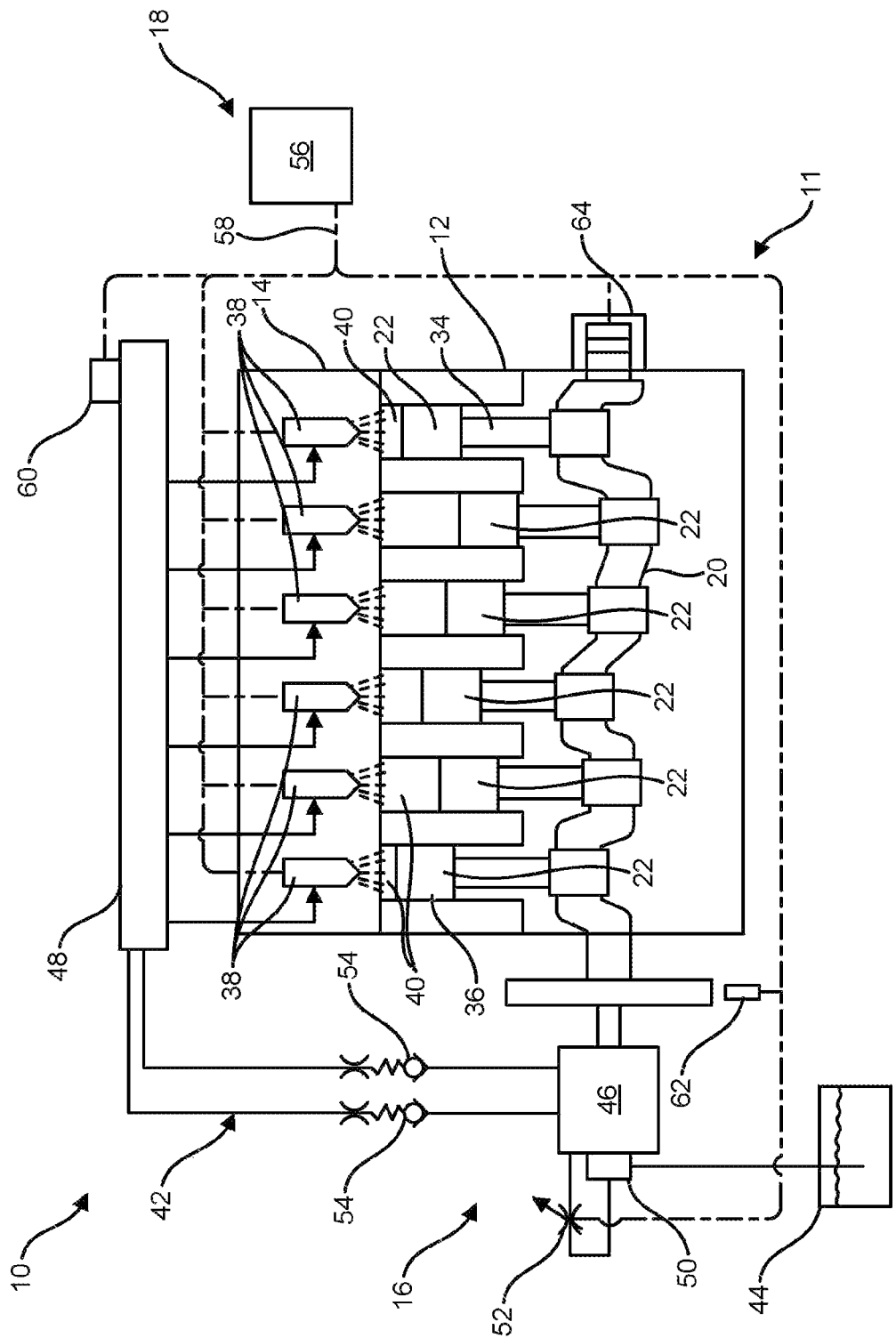
FIG. 1 is a simplified schematic of a portion of an example internal combustion engine.

Referring to FIG. 1, a simplified schematic of a portion of an example internal combustion engine 10 is shown. Engine 10 includes an engine body 11, which includes an engine block 12 and a cylinder head 14 attached to engine block 12, a fuel system 16, and a control system 18. Control system 18 receives signals from sensors located on engine 10 and transmits control signals to devices located on engine 10 to detect, analyze, and control the function of those devices, such as one or more fuel injectors.

Periodically, the fuel system 16 stops the flow of fuel to the accumulator of fuel system 16 after fuel system 16 receives a fuel flow cutout command to stop fuel flow. The term "cutout" in this disclosure corresponds to shutoff, stoppage, or stopping of fuel flow to the fuel accumulator. While the fuel flow to the fuel accumulator is stopped, which forms a termination event, control system 18 receives signals from the pressure sensor associated with the fuel accumulator indicative of the fuel pressure in the fuel accumulator. In some embodiments, the control system 18 may collect fuel pressure data during a fuel flow cutout event and/or use the fuel pressure data collected during a fuel flow cutout event, for example, to reduce noises and/or isolate fuel pressure changes only attributed to fuel injection events. In some cases, the control system 18 processes the fuel pressure data to identify a timing for a pressure drop greater than a predetermined threshold to measure the actual SOI timing. In some cases, the fuel pressure data is crank synchronous fuel pressure data, which refers to the fuel pressure data in crank angle domain. In some embodiments, crank angle domain refers to data being sampled in crank angles (e.g., 0°, 6°, 120°, etc.). In some cases, the control system 18 is further configured to receive an indication of SOI command to determine a commanded SOI timing and determine a timing offset or an offset trend of fuel injection drifting based on the measured SOI timing and the commanded SOI timing. In some cases, the SOI timing is measured and/or determined in crank angles.

In the example illustrated in FIG. 1, the engine body 12 includes a crankshaft 20, a plurality of pistons 22, and a plurality of connecting rods 34. Pistons 22 are positioned for reciprocal movement in a plurality of engine cylinders 36, with one piston positioned in each engine cylinder 36. A connecting rod 34 connects each piston to crankshaft 20. The movement of the pistons under the action of a combustion process in engine 10 causes connecting rods 34 to move crankshaft 20.

In the example illustrated, a plurality of fuel injectors 38 are positioned within cylinder head 14. Each fuel injector 38 is fluidly connected to a combustion chamber 40. Fuel system 16 provides fuel to injectors 38, which is then injected into combustion chambers 40 by the action of fuel injectors 38, forming one or more injection events. Fuel system 16 includes a fuel circuit 42, a fuel tank 44, which contains a fuel, a high-pressure fuel pump 46 positioned along fuel circuit 42 downstream from fuel tank 44, and a fuel accumulator or rail 48 positioned along fuel circuit 42 downstream from high-pressure fuel pump 46. While fuel accumulator or rail 48 is shown as a single unit or element in the exemplary embodiment, accumulator 48 may be distributed over a plurality of elements that contain high-pressure fuel. These elements may include fuel injector(s) 38, high-pressure fuel pump 46, and any lines, passages, tubes, hoses and the like that connect high-pressure fuel to the plurality of elements, and a separate fuel accumulator 48 may thus be unnecessary.

In the example illustrated, fuel system 16 also includes an inlet metering valve 52 positioned along fuel circuit 42 upstream from high-pressure fuel pump 46 and one or more outlet check valves 54 positioned along fuel circuit 42 downstream from high-pressure fuel pump 46 to permit one-way fuel flow from high-pressure fuel pump 46 to fuel accumulator 48. Inlet metering valve 52 has the ability to vary or shut off fuel flow to high-pressure fuel pump 46, which thus shuts off or stops fuel flow to fuel accumulator 48. Though not shown, additional elements may be positioned along fuel circuit 42. For example, inlet check valves may be positioned downstream from inlet metering valve 52 and upstream from high-pressure fuel pump 46, or inlet check valves may be incorporated in high-pressure fuel pump 46. Fuel circuit 42 connects fuel accumulator 48 to fuel injectors 38, which receive fuel from fuel circuit 42 and then provide controlled amounts of fuel to combustion chambers 40. In some embodiments, fuel system 16 may also include a low-pressure fuel pump 50 positioned along fuel circuit 42 between fuel tank 44 and high-pressure fuel pump 46. Low-pressure fuel pump 50 increases the fuel pressure to a first pressure level prior to fuel flowing into high-pressure fuel pump 46, which increases the efficiency of operation of high-pressure fuel pump 46. In some embodiments, fuel system 16 has a fuel pressure relief valve that may be mechanical or electronically actuated downstream of fuel accumulator 48, which provides an alternate path to relieve excess fuel from fuel accumulator to a fuel tank through fuel drain circuit during high fuel pressure events due to any variation in the fuel system components or failure.

Control system 18 may include a control processor 56 and a wire harness 58. Many aspects of the disclosure are described in terms of operations to be performed by a computer system or other hardware capable of executing programmed instructions. It will be recognized that in each of the embodiments, the various operations could be performed by specialized circuits (e.g., discrete logic gates interconnected to perform a specialized function), by program instructions (software), such as program modules, being executed by one or more processors, or by a combination of these components. Moreover, the disclosure can additionally be considered to be embodied within a non-transitory computer readable medium, such as solid-state memory, magnetic disk, and optical disk containing an appropriate set of computer instructions, such as program modules, and data structures that would cause a processor to carry out the techniques and embodiments described herein. A computer-readable medium may include the following: an electrical connection having one or more wires, magnetic disk storage, magnetic cassettes, magnetic tape or other magnetic storage devices, a portable computer diskette, a random access memory (RAM), a read-only memory (ROM), an erasable programmable read-only memory (EPROM or Flash memory), or any other medium capable of storing information.

It should be noted that the system of the present disclosure is illustrated and discussed herein as having various modules and units that perform particular functions. It should be understood that these modules and units are merely schematically illustrated based on their function for clarity purposes, and do not necessarily represent specific hardware or software. In this regard, these modules, units and other components may be hardware and/or software implemented to substantially perform their particular functions explained herein. The various functions of the different components can be combined or segregated as hardware and/or software modules in any manner, and can be useful separately or in combination. Thus, the various aspects of the disclosure may be embodied in many different forms, and all such forms are contemplated to be within the scope of the disclosure.

Control system 18 also includes an accumulator pressure sensor 60 and a crank angle sensor. While sensor 60 is described as being a pressure sensor, sensor 60 may be other devices that may be calibrated to provide a pressure signal that represents fuel pressure, such as a force transducer, strain gauge, or other device. The crank angle sensor may be a toothed wheel sensor 62, a rotary Hall sensor 64, or other type of device capable of measuring the rotational angle of crankshaft 20. In some cases, control system 18 uses signals received from accumulator pressure sensor 60 and the crank angle sensor to determine the combustion chamber receiving fuel, which is then used to analyze the signals received from accumulator pressure sensor 60, described in more detail hereinbelow. In some cases, the combustion chamber currently firing is estimated by the control system 18 using the crank sensor or a combination of crank and cam sensor, where the cam sensor is located near the camshaft controlling the intake/exhaust valves.

Control processor 56 may be an electronic control unit or electronic control module (ECM) that may monitor conditions of engine 10 or an associated vehicle in which engine 10 may be located. Control processor 56 may be a single processor, a distributed processor, an electronic equivalent of a processor, or any combination of the aforementioned elements, as well as software, electronic storage, and the like. Control processor 56 may include a digital or analog circuit. Control processor 56 may connect to certain components of engine 10 by wire harness 58, though such connection may be by other means, including a wireless system. For example, control processor 56 may connect to and provide control signals to inlet metering valve 52 and to fuel injectors 38. In another example, control processor 56 may connect to and provide control signals to a fuel pressure relief valve.

When engine 10 is operating, combustion in combustion chambers 40 causes the movement of pistons 22. The movement of pistons 22 causes movement of connecting rods 34, which are drivingly connected to crankshaft 20, and movement of connecting rods 34 causes rotary movement of crankshaft 20. The angle of rotation of crankshaft 20 is measured by engine 10 to aid in timing of combustion events in engine 10 and for other purposes. The angle of rotation of crankshaft 20 may be measured in a plurality of locations, including a main crank pulley (not shown), an engine flywheel (not shown), an engine camshaft (not shown), or on the crankshaft itself. Measurement of crankshaft 20 rotation angle may be made with toothed wheel sensor 62, rotary Hall sensor 64, and by other techniques. A signal representing the angle of rotation of crankshaft 20, also called the crank angle, is transmitted from toothed wheel sensor 62 (e.g., either inductive sensor or hall sensor), rotary Hall sensor 64, or other device to control system 18.

In some embodiments, crankshaft 20 drives high-pressure fuel pump 46 and low-pressure fuel pump 50. The action of low-pressure fuel pump 50 pulls fuel from fuel tank 44 and moves the fuel along fuel circuit 42 toward inlet metering valve 52. From inlet metering valve 52, fuel flows downstream along fuel circuit 42 through inlet check valves (not shown) to high-pressure fuel pump 46. High-pressure fuel pump 46 moves the fuel downstream along fuel circuit 42 through outlet check valves 54 toward fuel accumulator or rail 48. Inlet metering valve 52 receives control signals from control system 18 and is operable to block fuel flow to high-pressure fuel pump 46. Inlet metering valve 52 may be a proportional valve or may be an on-off valve that is capable of being rapidly modulated between an open and a closed position to adjust the amount of fluid flowing through the valve.

In one embodiment, fuel pressure sensor 60 is connected with fuel accumulator 48 and is capable of detecting or measuring the fuel pressure in fuel accumulator 48. Fuel pressure sensor 60 sends signals indicative of the fuel pressure in fuel accumulator 48 to control system 18. Fuel accumulator 48 is connected to each fuel injector 38. Control system 18 provides control signals to fuel injectors 38 that determine operating parameters for each fuel injector 38, such as the length of time fuel injectors 38 operate, start of injection, and the number of fueling pulses per a firing or injection event period, which determines the amount of fuel delivered by each fuel injector 38.

In some embodiments, fuel system 16 may also have a fuel pressure relief valve that may be mechanical or electronically actuated downstream of fuel accumulator, which provides an alternate path to relieve excess fuel from fuel accumulator to a fuel tank through a fuel drain circuit during high fuel pressure events due to any variation in the fuel system components or failure. If an electronic relief valve is used, it may receive control signals from control system 18 and be operable to relieve undesired excess flow to the fuel tank through the fuel drain circuit. In some cases, the usage of a mechanical or electronic of fuel pressure relief value depends on the overall engine configuration and application.

Figure 2:
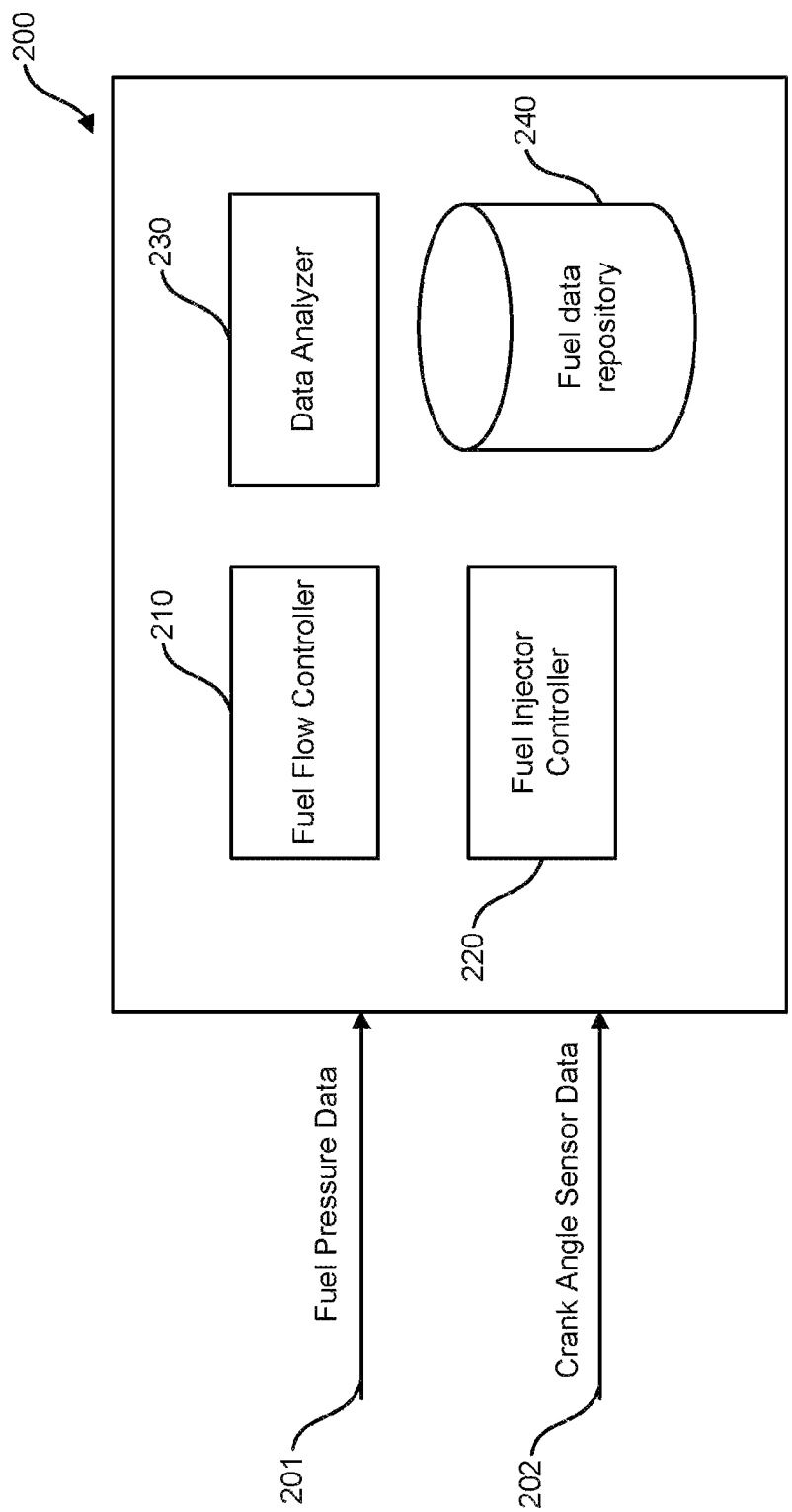
FIG. 2 is a conceptual block diagram one embodiment of a fuel injection timing drift detection and compensation system.

Control system 18 includes a process that controls certain components of engine 10 to enable measurement and/or compensation of fuel injection timing drift. Turning now to FIG. 2, a fuel injection timing drift detection and compensation system 200, which is a part of control system 18, in accordance with one embodiment of the present disclosure is shown. In the embodiment illustrated, the fuel injection timing drift detection and compensation system 200 includes a fuel flow controller 210, a fuel injector controller 220, a data analyzer 230, and a fuel data repository 240. One or more components of the fuel injection timing drift detection and compensation system 200 is optional.

In some embodiments, the fuel injection timing drift detection and compensation system 200 receives fuel pressure data 201 and crank angle sensor data 202. In some cases, the fuel pressure data 201 and/or the crank angle sensor data 202 are stored in the fuel data repository 240. In some cases, the fuel pressure data 201 and/or the crank angle sensor data 202 includes associated timestamp. In some cases, the fuel pressure data 201 and/or the crank angle sensor data 202 are sampled in crank angles and stamped with crank angles. In some cases, the fuel flow controller 210 can generate a fuel flow cutout signal and provide the fuel flow cutout signal to the data analyzer 230. In some cases, in response to receiving the fuel flow cutout signal, the data analyzer 230 starts to analyze the fuel pressure data 201. In some embodiments, the data analyzer 230 identifies a fuel pressure drop greater than a predetermined pressure-drop threshold to measure a SOI timing. In some cases, the magnitude of predetermined pressure-drop threshold is selected based on the sampling frequency.

In some implementations, the data analyzer 230 is configured to group the fuel pressure data into subsets of fuel pressure data with data variances in each subset less than a predetermined fluctuation threshold and determine fuel pressure drops between two adjacent subsets of fuel pressure data. In some examples, if a selected pressure drop greater than the predetermined pressure-drop threshold is associated with a first subset of the pressure data and a second subset of the pressure data that is sampled after the first subset, the last pressure data of the first subset of fuel pressure data is used to determine the measured SOI timing. In some cases, the measured SOI timing is determined based on the second subset of fuel pressure data. In one example, consecutive fuel pressure data points are identified with pressure drops greater than the predetermined threshold. In such example, the first fuel pressure drop is used to determine the measured SOI timing. In some cases, the data analyzer 230 uses the crank angle sensor data 202 when determining the measured SOI timing. In some embodiments, the fuel injector controller 220 provides a SOI command signal to the data analyzer 230. The data analyzer 230 determines a commanded SOI timing based on the received signal. In some cases, the data analyzer 230 uses the crank angle sensor data 202 when determining the commanded SOI timing.

The fuel data repository 240 may be implemented using any one of the configurations described below. A data repository may include random access memories, flat files, XML files, and/or one or more database management systems (DBMS) executing on one or more database servers or a data center. A database management system may be a relational (RDBMS), hierarchical (HDBMS), multidimensional (MDBMS), object oriented (ODBMS or OODBMS) or object relational (ORDBMS) database management system, and the like. The data repository may be a single data repository. In some cases, the data repository may include a plurality of data repositories.

In some embodiments, the data analyzer 230 uses the measured SOI timing and the commanded SOI timing to determine a fuel injection timing offset. In one example, the timing offset (TimeOffset) is calculated using equation (1).

$$\text{TimeOffset} = \text{MeasuredSOI} - \text{CmdSOI} \quad (1),$$

where MeasuredSOI is the measured SOI timing and CmdSOI is the commanded SOI timing. In some cases, the timing offset is used as an indication of timing trend, for example, indicating the measured SOI timing is before or after the commanded SOI timing. In some cases, the timing offset and/or the timing trend is used to determine a compensation to the fuel injection timing.

In one example, the data analyzer 230 uses the timing trend to select a fuel injection timing compensation with a predetermined compensation amount. For example, if the timing trend is after, the predetermined compensation amount is 1 degree of crank angle with respect to TDC ("Top-Dead-Center") and the data analyzer 230 selects a fuel injection timing compensation of 1 degree with respect to TDC. As another example, if the timing trend is before, the predetermined compensation amount is 1 degree of crank angle with respect to TDC and the data analyzer 230 selects a fuel injection timing compensation of −1 degree with respect to TDC. In another example, the data analyzer 230 applies a filter to the timing offset and/or timing trend to determine a timing compensation. For example, the data analyzer 230 applies a first order filter to the timing offset and/or timing trend to determine a timing compensation. In one example, the determined timing compensation (f-SOI) is calculated as below:

$$f\text{-SOI}_{current} = \alpha * f\text{-SOI}_{previous} + (1-\alpha) * \text{SOI}_{offset} \quad (2),$$

wherein $f\text{-SOI}_{current}$ is the timing compensation for the current calculation, $\alpha$ is the coefficient or referred to as the filter constant/coefficient, $f\text{-SOI}_{previous}$ is the timing compensation for the previous calculation, and $\text{SOI}_{offset}$ is the determined timing offset by the data analyzer 230. The coefficient $\alpha$ is selected as, for example, 0.9, to function as a smoothing filter to the calculated timing offset.

In some cases, the data analyzer 230 provides the determined timing compensation (e.g., a calculated timing offset, a predetermined timing compensation, a filtered timing offset) to the fuel injector controller 220 to adjust future commanded SOI timing. In some cases, the data analyzer 230 is configured to determine a timing compensation for each of the injectors using any one of the embodiments described herein. In some cases, the data analyzer 230 is configured to flag a fault code if fault criteria based on one or more of the determined timing compensations and/or timing offsets for injectors are met. In some cases, the fault code is a standard engine fault code, for example, as listed in On-Board Diagnostics ("OBD-II").

In some cases, various components of the system 200 can execute software or firmware stored in non-transitory computer-readable medium to implement various processing steps. Various components and processors of the system 200 can be implemented by one or more computing devices, including but not limited to, circuits, a computer, a processor, a processing unit, a microprocessor, and/or, a mobile computing device. In some cases, various components of the system 200 can be implemented on a shared computing device. Alternatively, a component of the system 200 can be implemented on multiple computing devices. In some implementations, various modules and components of the system 200 can be implemented as software, hardware, firmware, or a combination thereof. In some cases, various components of the fuel injection timing drift detection and compensation system 200 can be implemented in software or firmware executed by a computing device.

Figure 3:
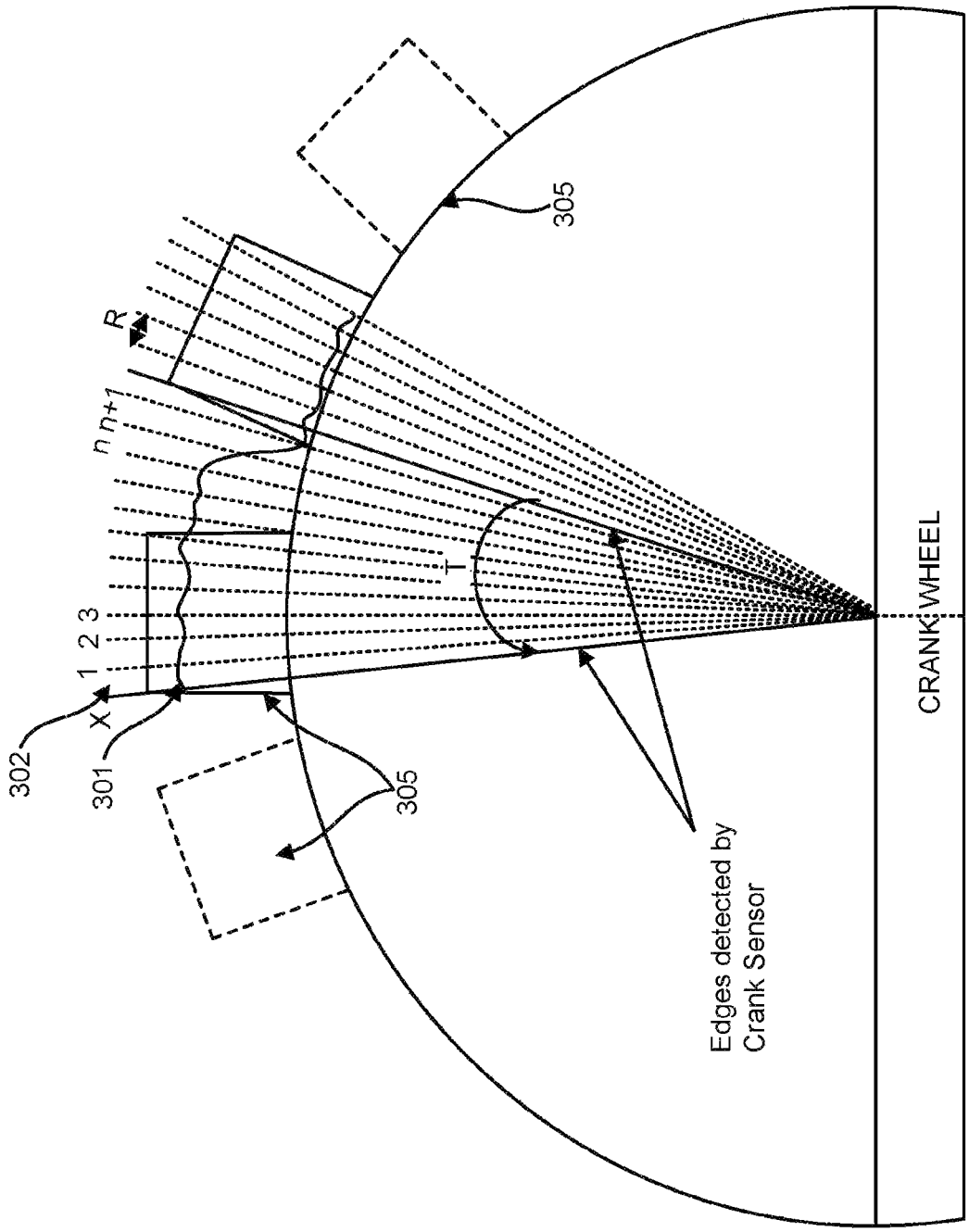
FIG. 3 is an illustrative example of crank synchronous fuel pressure data.

FIG. 3 is an illustrative example of crank synchronous fuel pressure data. In one embodiment, the fuel pressure data is synchronized with crank angles by reference tooth (e.g., the missing tooth). In one example, the crank angle is detected by a crank angle sensor, for example, the crank toothed wheel sensor 62 illustrated in FIG. 1. In one embodiment, the crank angle sensor detects rising edges of crank teeth. In one embodiment, an angle between adjacent crank teeth is a known degree, T. In the example illustrated, the relative angle between adjacent crank teeth 305 is further divided into a sampling angle, R, where a fuel pressure sensor (e.g., 60) samples at a sampling resolution S, and generates pressure data 301. In some cases, a resolution of sampling rate R can be calculated using equation (3):

$$R = T*C*N/(60*S) \qquad (3)$$

where T is the angle between adjacent teeth. S is the sampling frequency, C is the number of teeth on a crank wheel, and N is the engine speed in RPM (i.e., revolutions per minute). In one example, the resolution R=0.6 degree/pressure sample, when T=6°, C=60, S=10 KHz. In some cases, the sampling frequency S of fuel pressure data is greater than 1 KHz. In some cases, the sampling frequency S is greater than 5 KHz.

In one embodiment, the fuel pressure data 301 is sampled at a known constant frequency during a known period of time with known crank angle changes, such that the fuel pressure data 301 is synchronized with crank angle sensor data 302. In one embodiment, the fuel pressure data 301 is synchronized with crank angles by sampling the fuel pressure data in crank angles. In another embodiment, the memory buffer storing the sampled fuel pressure data 301 is stamped with crank angles.

Figure 4:
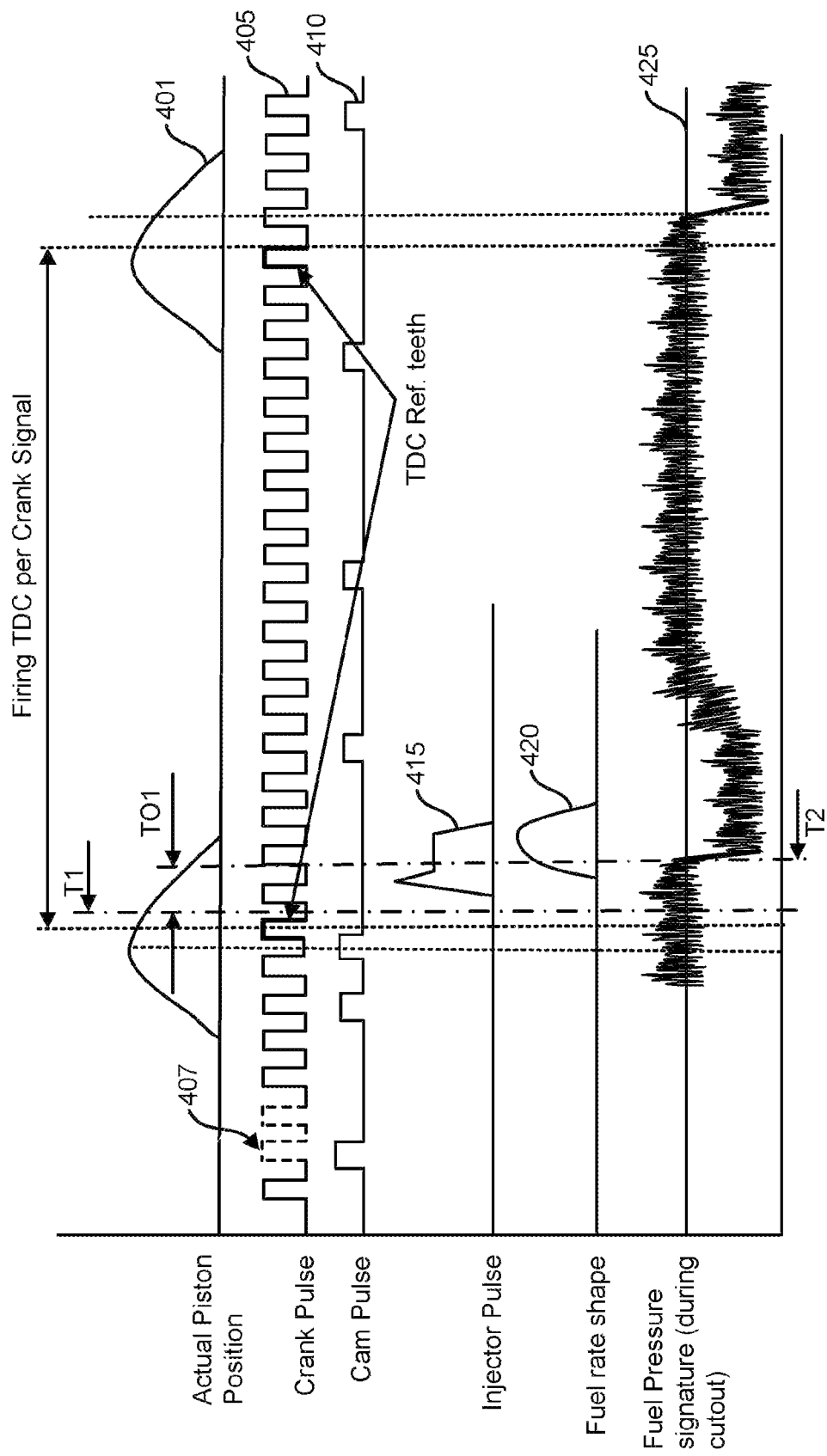
FIG. 4 is an illustrative example of relevant representative signal waveforms.

FIG. 4 is an illustrative example of relevant representative signal waveforms. The waveform 401 illustrates one example of actual piston (e.g., 22 in FIG. 1) position. The waveform 405 illustrates an example crank pulse, with the dash waveform 407 illustrating waveforms for the missing crank tooth. The waveform 410 illustrates one example of cam pulse. The waveform 415 illustrates one example of injector pulse representing injector current. The waveform 420 illustrates one example of fuel rate shape. The waveform 425 illustrates one example fuel pressure data (e.g. 201 of FIG. 2). In the example illustrated, a fuel pressure drop greater than a predetermined threshold is detected at T2, where a commanded SOI timing is at T1. In some cases, the commanded SOI timing T1 and/or T2 are relative to the timing of TDC. The timing offset TO1 is shown as the difference between T1 and T2.

Figure 5A:
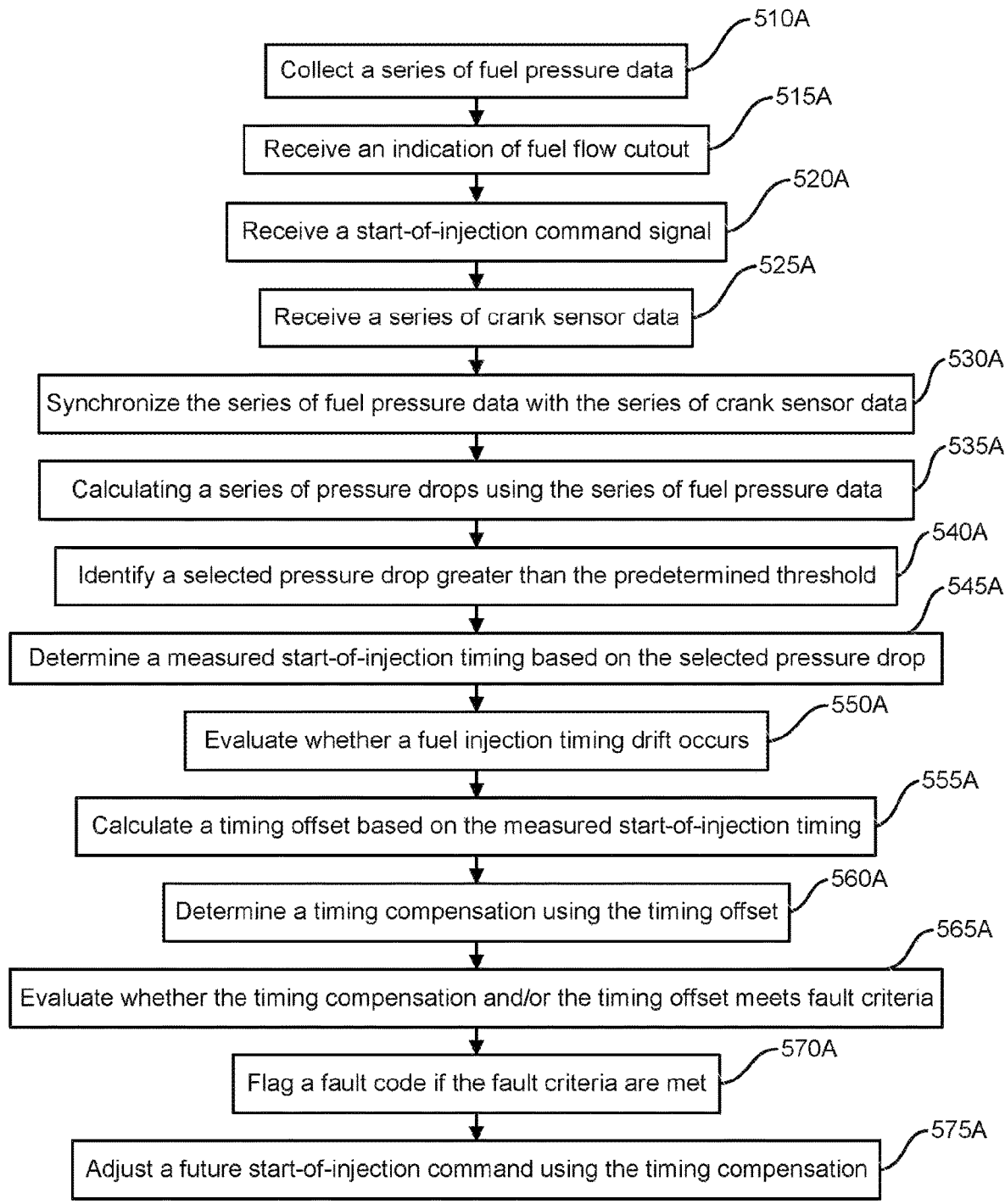
FIG. 5A is a flow diagram of one example of a fuel injection timing detection and compensation system.

FIG. 5A illustrates a flow diagram of one example of a fuel injection timing detection and compensation system. One or more steps in the flow diagram is optional. In one example, the system collects a series of fuel pressure data (510A). The system is also configured to receive an indication of fuel flow cutout (515A). The indication of fuel flow cutout includes, for example, a command, a signal, or other indications indicating the start of a fuel flow cutout period. In some cases, the fuel flow cutout period ends after receiving the EOI ("End of Injection") signal of the last cylinder of the plurality of cylinders in the engine. In one example of six cylinders (e.g., cylinders #1, #2, #3, #4, #5, #6) and cylinders starting injections in the order of #1, #5, #3, #6, #2, and #4, the fuel flow cutout period ends after receiving the EOI signal of cylinder #4. Further, the system receives a start-of-injection command indication (520A) and optionally determines a commanded SOI timing. In some cases, the system receives a series of crank sensor data (525A) and is configured to synchronize the series of fuel pressure data with the series of crank sensor data (530A). Next, the system calculates a set of pressure drops using the series of fuel pressure data (535A).

In some cases, the system calculates the set of pressure drops using the series of fuel pressure data collected after the fuel flow cutout indication is received. In some cases, the system calculates the set of pressure drops using the series of fuel pressure data collected during a fuel flow cutout period. In some cases, each of the set of pressure drops is a difference between a current sample of fuel pressure data and a fuel pressure data of a preceding sample. In some cases, the preceding sample is the sample immediately preceding the current sample. In some examples, consecutive fuel pressure data are identified with pressure drops greater than the predetermined threshold. In such examples, the first fuel pressure drop is used to determine the measured SOI timing. In some cases, the system separates the series of fuel pressure data into subsets, where each subset of fuel pressure data is consecutively sampled data and has a variance less than a predetermined fluctuation threshold. In one example, a variance of a set of data is calculated by equation (1) below:

$$\sigma^2 = \frac{\sum_{i=1}^{N}(X_i - \mu)^2}{N-1}, \qquad (1)$$

where N is the number of samples in the set of data, $\mu$ is the mean of the set of data, $\sigma^2$ is the variance of the set of data.

In some cases, the system determines a set of pressure drops based on two adjacent subsets of fuel pressure data. In one example, if a first subset of fuel pressure data has a first baseline value and a second subset of fuel pressure data has a second baseline value, where the second subset is immediately sampled after the first subset of fuel pressure data, the pressure drop is a difference between the first baseline value and the second baseline value. In some cases, a baseline value is an average value of a set of data. In some cases, a baseline value is a medium value of a set of data.

In one example, the system compares the set of pressure drops with a predetermined threshold to identify a selected pressure drop greater than the predetermined threshold (540A) and determines a measured start-of-injection timing based on the selected pressure drop (545A). In some examples, with the selected pressure drop associated with a first subset of the pressure data and a second subset of the pressure data that is sampled after the first subset, the last pressure data of the first subset of fuel pressure data is used to determine the measured SOI time. In some cases, the last pressure data is stamped with a crank angle. Further, the system evaluates whether a fuel injection timing drift occurs (550A) based on the measured start-of-injection timing and the received start-of-injection command signal.

In some cases, the system calculates a timing offset based on the measured start-of-injection timing (555A) and the received SOI command signal. In some cases, the timing offset is calculated based on the measured start-of-injection timing and the commanded SOI timing. In some cases, both the commanded start-of-injection timing and the measured start-of-injection timing are in crank angles. In some cases, the calculated timing offset is in crank angles. In one example, the calculated timing offset is a timing drift trend. For example, the calculated timing offset is an indication of the measured fuel injection before the commanded fuel injection or an indication of the measured fuel injection after the commanded fuel injection. In some embodiments, the system collects the fuel pressure data in high resolution, for example, to improve the timing offset accuracy. In some cases, the fuel pressure data is collected at a sample frequency greater than or equal to 1 KHz. In some cases, the fuel pressure data is collected at a sample frequency greater than or equal to 2 KHz. In some cases, the fuel pressure data is collected at a sample frequency greater than or equal to 5 KHz. In some cases, the fuel pressure data is collected at a sample frequency greater than or equal to 10 KHz.

Optionally, the system determines a timing compensation using the timing offset (560A). In some cases, the system stores timing offsets determined in a data repository (e.g., 240 of FIG. 2). In some cases, each of the timing offset records stored in the data repository are associated with a timestamp/crank angle position and an injector. In some cases, the system applies a filter to the timing offset to determine the timing compensation. In some cases, the system applies a filter to the timing offset to determine a timing compensation using one or more of the timing offsets stored in the data repository associated with the same injector. In some cases, the system applies a smoothing filter to the timing offset. In some cases, the system applies a low pass filter to the timing offset. In some cases, the system applies a first order filter to the timing offset. In some cases, the system applies a second order filter to the timing offset.

Optionally, the system evaluates whether the timing compensation and/or the timing offset meets fault criteria (565A). In one example, the fault criteria include a predetermined offset threshold, such that the fault criteria are met if the value of one or more timing offsets is greater than the predetermined offset threshold. As used herein, "value" refers to a magnitude of data or a signal. In one example, the fault criteria include a predetermined compensation threshold, such that the fault criteria are met if the value of one or more timing compensations is greater than the compensation threshold. In some cases, the fault criteria include timing conditions of all injectors (e.g., 6 injectors) of an engine. In some cases, the fault criteria include timing conditions for a single injector. In some cases, the fault criteria include timing conditions for a minimum number of injectors (e.g., 3 out of a total of 6 injectors). In some embodiments, the fault criteria include timing conditions for injector(s) over a period of time (e.g., 2 fuel flow cutout periods). For example, the fault criteria includes that the system of fix injectors has three or more injection timing offsets greater than the predetermined offset threshold during two consecutive fuel flow cutout periods. In some cases, the period of time is a plurality of fuel flow cutout periods. In some embodiments, the fault criteria include timing conditions for injector(s) for a single period (e.g., 1 fuel flow cutout period). In some cases, the fault criteria include a timing condition model (e.g., fault count as a function of time). In one example, the timing condition model is a linear model over time. In another example, the timing condition model is a nonlinear model over time.

Optionally, if the fault criteria are met, the system flags a fault code (570A). In some cases, the fault code is selected from a predetermined set of codes. In some example, the fault code is selected from OBD-II codes. In some embodiments, the system adjusts the timing of a next or a future start-of-injection command using the timing compensation (575A). For example, a timing compensation of 1° for an injector is applied to the timing of the next start-of injection command to the injector.

Figure 5B:
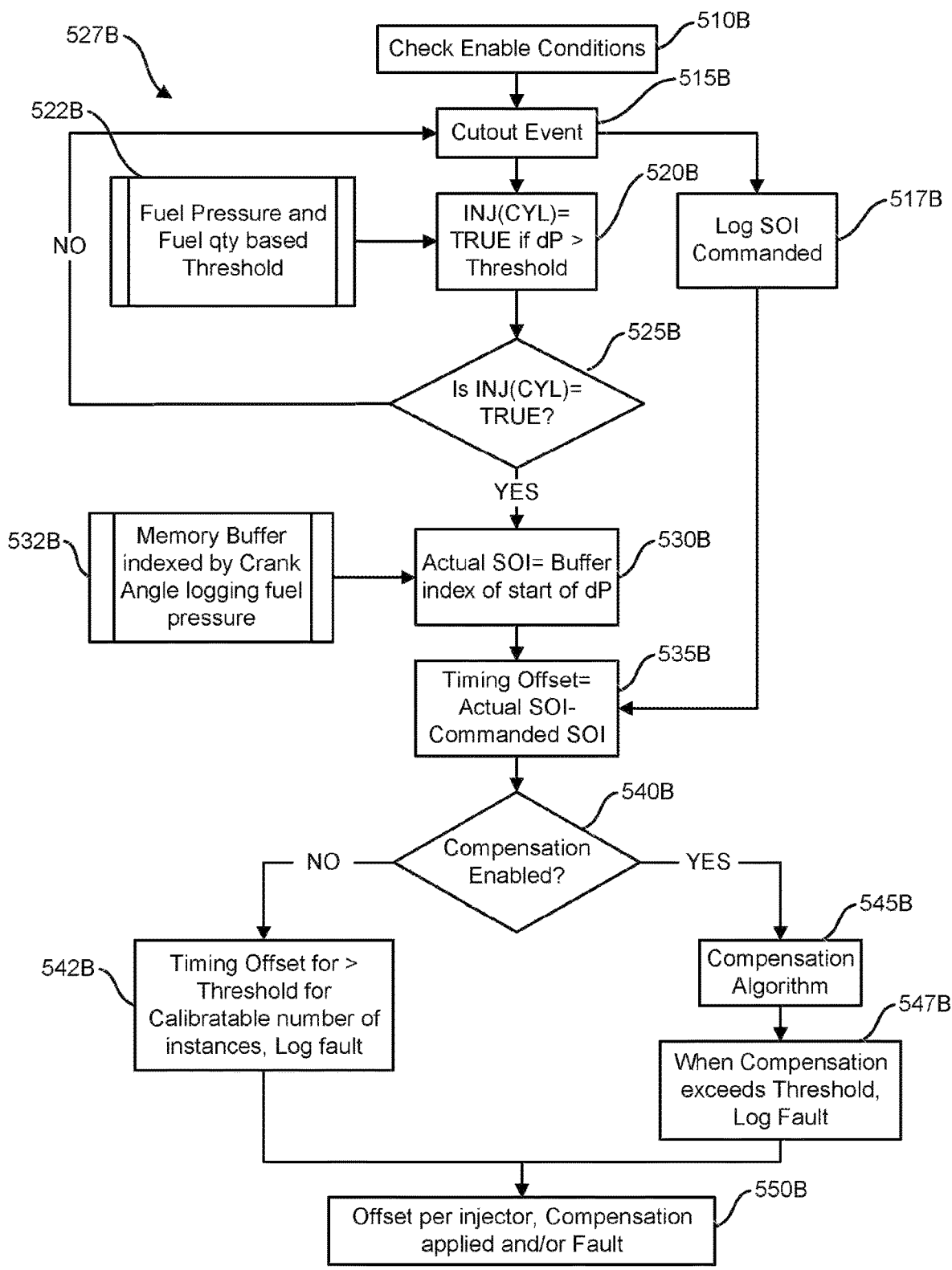
FIG. 5B is a flow diagram of one example embodiment of a fuel injection timing detection and compensation system.

FIG. 5B illustrates a flow diagram of one example embodiment of fuel injection timing drift detection and compensation system. One or more steps in the flow diagram are optional. The system first checks enabling conditions (510B). In some embodiments, the enabling conditions include a fueling logic, a rail pressure signal, an engine speed and position signal, and the like. The system looks for a fuel flow cutout event (515B). In some cases, the fuel flow cutout event is indicated by a command sent to the engine. In some cases, the fuel flow cutout event takes place periodically (e.g., every 36 seconds). During the cutout event, or referred to as cutout period, the system logs SOI commands (517B), for example, for a plurality of injectors. During the cutout event, the system analyzes fuel pressure data to determine if an injection occurs (520B). In one example, the system evaluates whether the delta value of fuel pressure data is greater than a predetermined threshold. In some cases, the predetermined threshold is fuel pressure based threshold (522B).

The system evaluates whether a cylinder injection occurs (525B) during the cutout event. If the cylinder injection has not occurred, the system goes back to step 515B. If the cylinder injection has occurred, the system determines a timing of a measured SOI, also referred to as actual SOI (530B). In one embodiment, the measured SOI timing is represented by the buffer index of the start of delta pressure that is greater than the predetermined threshold. In some cases, the memory buffer of the fuel pressure data and corresponding fuel pressure drop data is indexed by crank angle (532B). In some cases, the delta pressure is logged using the same index of the corresponding fuel pressure data. In some cases, the measured SOI timing is represented or converted to a crank angle. The system determines a timing offset using the actual SOI and the commanded SOI information (535B), using any one of the embodiments described herein.

The system checks whether compensation is enabled (540B). If compensation is not enabled, optionally, the systems logs fault information if fault criteria are met (542B). In one example, the fault criteria include offset threshold for a calibratable number of instances. If the timing offset is greater than the offset threshold for a calibratable number of instances, fault information is logged. The fault information includes, for example, a fault code, a fault condition, fault criteria used, and the like. If compensation is enabled, the system applies a compensation algorithm (545B), using any one of the embodiments described herein. When the compensation exceeds a compensation threshold, a fault information is logged (547B), including, for example, a fault code, a fault condition, fault criteria used, and the like. In some cases, the system logs or outputs timing offset per injector, the compensation applied, and/or fault information (550B).

Figure 6:
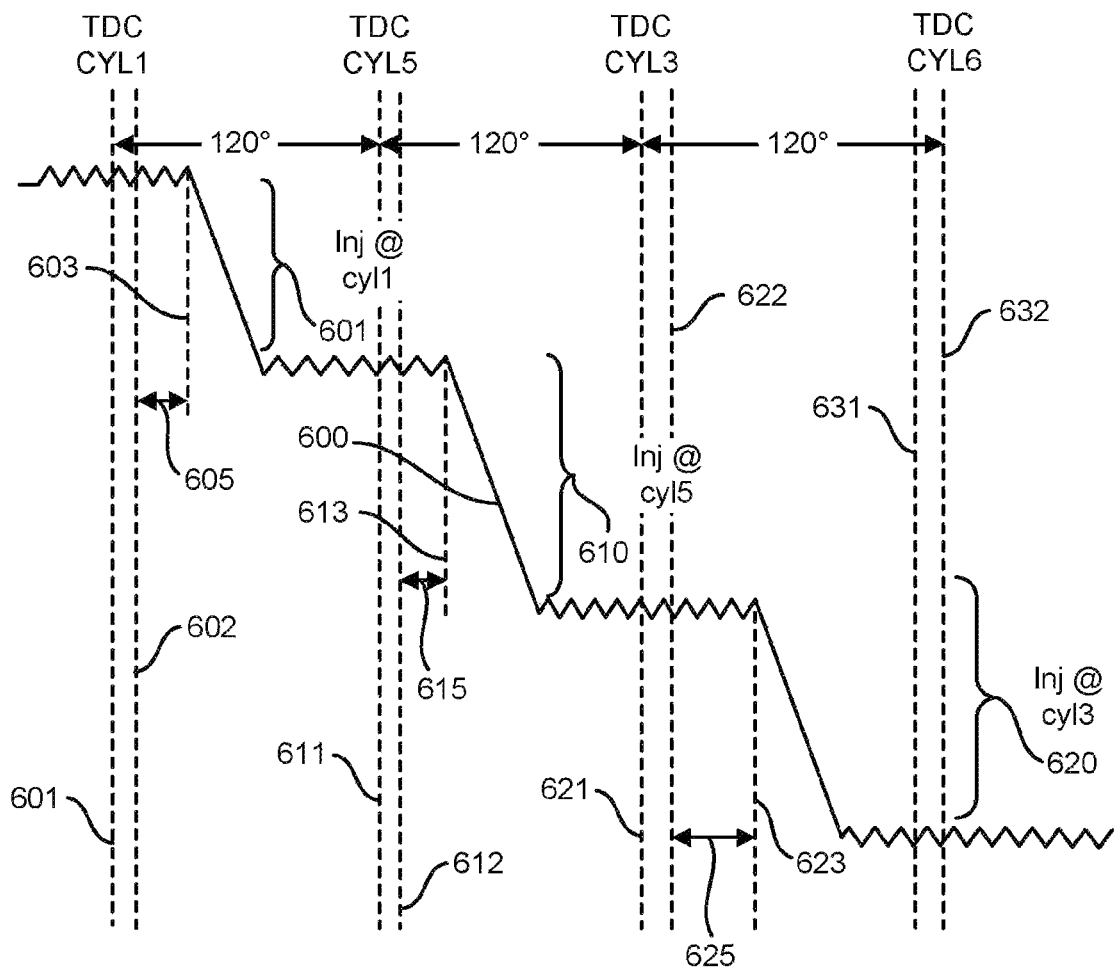
FIG. 6 is an illustrative waveform of fuel pressure data of an engine having multiple cylinders and injectors.

FIG. 6 is an illustrative waveform of fuel pressure data of an engine having multiple cylinders and injectors. In the example illustrated, the waveform 600 represents a portion of fuel pressure data of a six-cylinder engine during a fuel flow cutout period. 601 illustrates the fuel pressure drop caused by injection of cylinder #1, 610 illustrates the fuel pressure drop caused by injection of cylinder #5, and 620 illustrates the fuel pressure drop caused by cylinder #3. The commanded SOI times are logged at lines 602, 612, 622, and 632, respectively for cylinder #1, #5, #3, #6, with the respective TDC at 601, 611, 621, and 631. The start of the pressure drop time (603, 613, and 623) indicates the measured SOI time for cylinder #1, #5, and #3 respectively. In one example, the timing offset for cylinder #1, #5, #3 is indicated as 605, 615, and 625 respectively. In some embodiments, this timing data is used to determine whether timing drift occurs and/or the timing compensation for each injector corresponding to a cylinder.

While various embodiments of the disclosure have been shown and described, it is understood that these embodiments are not limited thereto. The embodiments may be changed, modified and further applied by those skilled in the art. Therefore, these embodiments are not limited to the detail shown and described previously, but also include all such changes and modifications.

What is claimed is:

1. An electronic control system, comprising:
one or more memories having stored thereon instructions and a series of fuel pressure data measured by a fuel pressure sensor in operative communication with a fuel accumulator and the electronic control system;
one or more processors configured to execute the instructions to perform operations comprising:
receiving an indication of fuel flow cutout, the indication comprising at least one of a fuel flow cutout command and a fuel flow cutout signal generated by a fuel flow controller;
receiving a start-of-injection command signal;
in response to receiving the indication of fuel flow cutout,
calculating, by the one or more processors, a set of pressure drops using the series of fuel pressure data received from the fuel pressure sensor;
comparing, by the one or more processors, the set of pressure drops with a predetermined threshold to identify a selected pressure drop greater than the predetermined threshold;
determining, by the one or more processors, a measured start-of-injection timing based on the selected pressure drop; and
evaluating, by the one or more processors, whether a fuel injection drifting occurs based on the received start-of-injection command signal and the measured start-of-injection timing.

2. The electronic control system of claim 1, wherein each of the set of pressure drops is calculated based on a first sample of fuel pressure data and a second sample of fuel pressure data, wherein the first sample of fuel pressure data is measured at a first time, and wherein the second sample of fuel pressure data is measured at a second time different from the first time.

3. The electronic control system of claim 1, wherein the operations further comprise:
grouping the series of fuel pressure data into a plurality of subsets of fuel pressure data, wherein each subset of fuel pressure data is consecutively sampled fuel pressure data and has a variance less than a predetermined fluctuation threshold, and wherein each of the set of pressure drops is calculated based on two adjacent subsets of fuel pressure data.

4. The electronic control system of claim 1, wherein evaluating a fuel injection drifting occurs comprises:
determining a timing offset based on the received start-of-injection command signal and the measured start-of-injection timing.

5. The electronic control system of claim 4, wherein the operations further comprise:
evaluating whether a first fault criterion on timing offset is met; and
in response to the first fault criterion being met, generating a fault code.

6. The electronic control system of claim 4,
wherein the operations further comprise: determining a timing compensation
based on the timing offset.

7. The electronic control system of claim 6, wherein the operations further comprise:
adjusting a timing of a next start-of-injection command based on the timing compensation.

8. The electronic control system of claim 6, wherein the operations further comprise:
evaluating whether a second fault criterion on timing compensation is met; and
in response to the second fault criterion being met, generating a fault code.

9. The electronic control system of claim 1, wherein the operations further comprise:
receiving a series of crank sensor data; and
synchronizing, by the one or more processor, the series of fuel pressure data with the series of crank sensor data such that the series of fuel pressure data is synchronized with crank angles.

10. A method implemented by a computer system having one or more processors and memories, comprising:
collecting a series of fuel pressure data from a fuel pressure sensor in operative communication with a fuel accumulator;
receiving an indication of fuel flow cutout;
receiving a start-of-injection command signal;
in response to receiving the indication of fuel flow cutout,
calculating, by the one or more processors, a set of pressure drops using the series of fuel pressure data;
comparing, by the one or more processors, the set of pressure drops with a predetermined threshold to identify a selected pressure drop greater than the predetermined threshold;
determining, by the one or more processors, a measured start-of-injection timing based on the selected pressure drop; and
evaluating, by the one or more processors, whether a fuel injection drifting occurs based on the received start-of-injection command signal and the determined start-of-injection timing.

11. The method of claim 10, further comprising:
receiving a series of crank sensor data; and
synchronizing, by the one or more processors, the series of fuel pressure data with the series of crank sensor data such that the series of fuel pressure data is synchronized with crank angles.

12. The method of claim 10, wherein each of the set of pressure drops is calculated based on a first sample of fuel pressure data and a second sample of fuel pressure data, wherein the first sample of fuel pressure data is measured at a first time, and wherein the second sample of fuel pressure data is measured at a second time different from the first time.

13. The method of claim 10, further comprising:
grouping the series of fuel pressure data into a plurality of subsets of fuel pressure data, wherein each subset of fuel pressure data is consecutively sampled fuel pressure data and has a variance less than a predetermined fluctuation, threshold, and wherein each of the set of pressure drops is calculated based on two adjacent subset of fuel pressure data.

14. The method of claim 10, wherein the series of fuel pressure data is sampled at a predetermined sample frequency.

15. The method of claim 10, wherein evaluating whether a fuel injection drifting occurs comprises:
determining a timing offset based on the received start-of-injection command signal and the determined start-of-injection timing.

16. The method of claim 15, further comprising:
evaluating, by the one or more processors, whether a first fault criterion on timing offset is met; and
in response to the first fault criterion being met, flagging a fault code.

17. The method of claim 15, further comprising:
determining a timing compensation using the timing offset.

18. The method of claim 17, further comprising:
adjusting a timing of a next start-of-injection command based on the timing compensation.

19. The method of claim 17, further comprising:
evaluating, by the one or more processors, whether a second fault criterion on timing compensation is met; and in response to the second fault criterion being met, flagging a fault code.

20. A method implemented by a computer system having one or more processors and memories, comprising:

collecting a series of crank synchronized fuel pressure data from a fuel pressure sensor in operative communication with a fuel accumulator;

receiving a start-of-injection command signal;

calculating, by the one or more processors, a set of pressure drops using the series of crank synchronous file] pressure data collected during a fuel flow cutout period;

comparing, by the one or more processors, the set of pressure drops with a predetermined threshold to identify a selected pressure drop greater than the predetermined threshold;

determining, by the one or more processors, a measured start-of-injection timing based on the selected pressure drop; and evaluating, by the one or more processors, whether a fuel injection drifting occurs based on the received start-of-injection command signal and the measured start-of-injection timing.

21. The method of claim 20, wherein each of the set of pressure drops is calculated based on a first sample of crank synchronous fuel pressure data and a second sample of crank synchronous fuel pressure data, wherein the first sample of crank synchronous fuel pressure data is measured at a first time, and wherein the second sample of crank synchronous fuel pressure data is measured at a second time different from the first time.

22. The method of claim 20, further comprising:
grouping the series of fuel pressure data into a plurality of subsets of fuel pressure data, wherein each subset of fuel pressure data is consecutively sampled fuel pressure data and has a variance less than a predetermined fluctuation threshold, and wherein each of the set of pressure drops is calculated based on two adjacent subset of fuel pressure data.

* * * * *